United States Patent
Yu

(10) Patent No.: US 7,920,656 B2
(45) Date of Patent: Apr. 5, 2011

(54) SEARCHING METHOD FOR MAXIMUM-LIKELIHOOD (ML) DETECTION

(75) Inventor: Jiun-Hung Yu, Nan-Tou Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 737 days.

(21) Appl. No.: 11/306,110

(22) Filed: Dec. 16, 2005

(65) Prior Publication Data

US 2006/0198470 A1    Sep. 7, 2006

(30) Foreign Application Priority Data

Dec. 17, 2004   (TW) ................................ 93139438 A

(51) Int. Cl.
*H04L 27/06* (2006.01)
(52) U.S. Cl. ........ 375/341; 375/262; 375/316; 375/340; 375/264
(58) Field of Classification Search ............ 375/341
See application file for complete search history.

(56) References Cited

U.S. PATENT DOCUMENTS

| | | | |
|---|---|---|---|
| 6,404,810 B1 * | 6/2002 | Girardeau et al. ........... 375/232 |
| 6,757,331 B2 | 6/2004 | Watanabe | |
| 6,785,341 B2 | 8/2004 | Walton et al. | |
| 7,292,647 B1 * | 11/2007 | Giannakis et al. ............ 375/295 |
| 7,394,860 B2 * | 7/2008 | Tong et al. .................... 375/267 |
| 7,424,063 B2 * | 9/2008 | Yee ................................. 375/267 |
| 2003/0076890 A1 | 4/2003 | Hochwald et al. | |
| 2004/0181419 A1 | 9/2004 | Davis et al. | |
| 2005/0008091 A1 * | 1/2005 | Boutros et al. ................ 375/267 |

OTHER PUBLICATIONS

Bertrand M Hochwald and Stephen Ten Brink, "Achieving Near-Capacity on a Multiple-Antenna Channel.", IEEE Trans. Commun., Mar. 2003, pp. 389-399, vol. 51, No. 3.

* cited by examiner

*Primary Examiner* — Shuwang Liu
*Assistant Examiner* — Lihong Yu
(74) *Attorney, Agent, or Firm* — Thomas, Kayden, Horstemeyer & Risley, LLP

(57) ABSTRACT

The present invention relates to a method for searching a solution point of maximum-likelihood detection. The solution point locates at a symbol constellation. The method includes the following steps: determining a central point and a norm by a zero-forcing detection method; determining a searching range according to the central point and the norm; determining at least one qualified solution point according to the searching range; and determining the solution point of maximum-likelihood detection from the qualified solution points.

12 Claims, 3 Drawing Sheets

SEARCHING METHOD FOR MAXIMUM-LIKELIHOOD (ML) DETECTION

BACKGROUND OF THE INVENTION

1. Field of the Invention

The present invention relates to a wireless communication system, and in particular, to a multi-input multi-output (MIMO) system for wireless communication.

2. Description of the Prior Art

Recently, due to the rapid increase in the requirements of wireless communication, academic circles and industrial manufacturers have been continuously researching transmission methods for highly efficient communication. According to basic communication theory, the simplest method for achieving highly efficient communication is to increase the bandwidth of signal transmission. As the bandwidth is restricted and limited, however, it is futile to claim greater efficiency by using a very wide bandwidth to transmit a lot of data. Consequently, a most interesting research subject is how to use a plurality of antennas for transmitting and receiving data under limited bandwidth to achieve highly efficient data communication. That is, in a particular circumstance with limited bandwidth, the amount of transmitted data can be raised through increasing the number of transmitting and receiving antennas.

Because different data is assigned to different antennas for transfer at the same time and at the same bandwidth, these signals transferred by different antennas will obviously interfere with each other at the receiving end. Therefore, a receiver utilizes a plurality of antennas to receive signals delivered by a plurality of antennas of a transmitter. As every antenna of the receiver receives signals transferred by a different antenna of the transmitter, however, the receiver cannot identify the signal received by one antenna unless the receiver executes signal processing. Please refer to FIG. 1. Assume a transmitter 10 includes M antennas and a receiver 20 includes N antennas. The transmitter 10 delivers M symbols $X_1, X_2, \ldots, X_M$ during one symbol duration, and then these symbols pass the channel and are received by N antennas of the receiver 20. $y_1, y_2, \ldots y_N$ represents signals received by different antennas at the same time, so the relationship between a transmission signal, a receiving signal, and the channel is described through vectors as the following:

$$Y = HX + W \qquad \text{eq. 1}$$

wherein $$Y = \begin{bmatrix} y_1 \\ y_2 \\ \vdots \\ y_N \end{bmatrix}, X = \begin{bmatrix} x_1 \\ x_2 \\ \vdots \\ x_M \end{bmatrix}, W = \begin{bmatrix} w_1 \\ w_2 \\ \vdots \\ w_N \end{bmatrix},$$

$$H = \begin{bmatrix} h_{11} & h_{12} & \cdots & h_{1M} \\ h_{21} & h_{22} & \cdots & h_{2M} \\ \vdots & \vdots & \ddots & \vdots \\ h_{N1} & h_{N2} & \cdots & h_{NM} \end{bmatrix}$$

W represents noise received by N antennas of the receiver 20, and H a represents signals transmitted by different antennas of the transmitter 10 passed to several possible channels to be received by the receiver 20. In detail, $h_{ij}$ represents the channel for signal transmission from antenna j of the transmitter 10 to antenna l of the receiver 20, and at the point of communication, symbols $X_1, X_2, \ldots, X_M$ delivered by the transmitter 10 may be BPSK, QPSK, 4-QAM, 16-QAM, or other modulation types. Consequently, the purpose of the receiver 20 is to properly process the signal Y received by antennas of the receiver 20 in order to identify symbols $X_1, X_2, \ldots, X_M$ delivered by M antennas of the transmitter 10. Furthermore, related art is disclosed in U.S. Pub. No. 2003/0076890, "method and apparatus for detection and decoding of signals received from a linear propagation channel" (this data is incorporated herein by reference). The related art has significant limitations, however.

The receiving end still has the unresolved issue of properly processing the receiving signal Y received by antennas of the receiver in order to obtain symbols delivered by M transmission antennas.

SUMMARY OF THE INVENTION

Therefore, one objective of the present invention is to provide a searching method for searching a solution point of maximum-likelihood (ML) detection, to solve the above-mentioned problem.

Another objective of the present invention is to provide a searching method for searching a solution point of ML detection that can be applied in a multi-input multi-output (MIMO) system.

A further objective of the present invention is to provide a searching method for searching a solution point of ML detection, and reducing searching time.

According to an embodiment of the present invention, a searching method for searching a solution point of ML detection is disclosed. The solution point locates at a symbol constellation, and the method includes: determining a central point and a norm by a zero-forcing detection method, wherein the solution point of ML detection locates inside a sphere that utilizes the central point to be a center and the norm to be a radius; determining a searching range according to the central point and the norm; creating at least one qualified solution point according to the searching range; and determining the solution point of ML detection from the qualified solution points.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
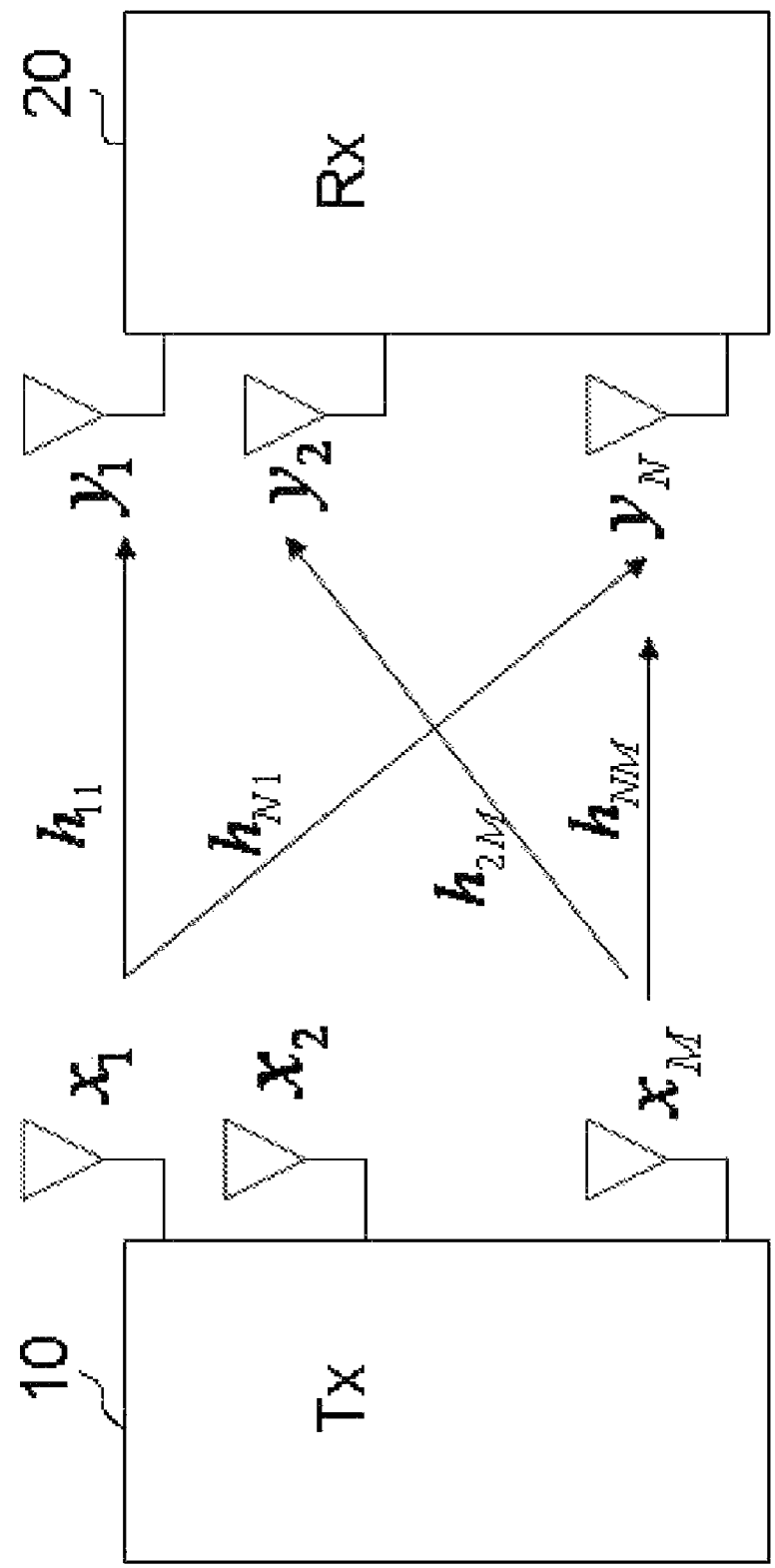
FIG. 1 is a diagram of a MIMO communication system with M antennas for transmission and N antennas for receiving.

In general, maximum-likelihood (ML) detection/decoding is considered as an optimal signal detection/decoding method, but due to its complexity, there also exist many sub-optimal detection/decoding methods with lower complexity such as the well-known zero-forcing (ZF) detection and MMSE detection. The present invention utilizes ZF detection aiding ML detection to reduce the complexity of ML detection. The following description further describes ML and ZF detection.

Briefly, the ML detection/decoding method is represented as $$\hat{X}_{ML} = \arg\{\min\{|Y-HX|^2\}\}, X \in \{QPSK/QAM\} \qquad \text{eq. 2}$$

The receiver predicts all possible lattices X delivered by the transmitter and utilizes eq. 2 to determine which set X (that is, which lattice X) satisfies eq. 2, to obtain the solution of ML detection $\hat{X}_{ML}$. In other words, defining $$C = |Y-HX|^2, \qquad \text{eq. 3}$$

the ML detection means that the receiver guesses all possible sets X delivered by the transmitter and applies eq. 3 to determine which set X creates minimum C, then the set X is the solution of ML detection/decoding and is labeled as $\hat{X}_{ML}$. Obviously, ML detection is a highly complex method. For example, every symbol transferred from the transmitter is modulated by 64-QAM, i.e. there are M symbols in one set X, resulting in the receiver having to guess $64^M$ combinations to obtain the solution of ML detection. It is difficult to materialize the extremely complex method to commercial products without proper simplification. Therefore, some sub-optimal methods are introduced, such as ZF detection:

$$\tilde{X}_0 = (H^H H)^{-1} H^H Y, \hat{X}_{ZF} = \text{slicer}(\tilde{X}_0) \qquad \text{eq. 4}$$

Eq. 4 is utilized while N is greater than M or equal to M, but for the condition N equals to M, ZF detection has another form:

$$\tilde{X}_0 = H^{-1} Y, \hat{X}_{ZF} = \text{slicer}(\tilde{X}_0) \qquad \text{eq. 5}$$

Eq. 4 and eq. 5 are both recognized as ZF detection. The following description explains how to utilize ZF detection aiding ML detection to realize a lower complex ML detection/decoding method.

A sphere decoding method is applied to transfer the solution of ML detection into another form:

$$\hat{X}_{ML} = \arg\{\min\{|Y-HX|^2\}\} = \arg\{\min(X-\tilde{X}_0)^H H^H H(X-\tilde{X}_0)\}, X \in \{QPSK/QAM\} \qquad \text{eq. 6}$$

In eq. 6, $\tilde{X}_0$ is treated as a central point of a sphere, and the solution of ML detection is a lattice that is nearest to the central point. The ML detection searches all lattices X, and finds a lattice $\hat{X}_{ML}$ related to the central point $\tilde{X}_0$ with shortest norm to be the solution of ML detection. In other words, $\hat{X}_{ML}$ creates a minimum C in the following equation:

$$C = (X-\tilde{X}_0)^H H^H H(X-\tilde{X}_0) \qquad \text{eq. 7}$$

It is therefore possible to define a proper radius or a norm and use $\tilde{X}_0$ to be a center to construct a sphere. If the norm is long enough, the sphere includes the solution point $\hat{X}_{ML}$ of ML detection. As mentioned above, the key point is how to determine a suitable radius or a norm. According to eq. 6, $\hat{X}_{ML}$ is the solution point of ML detection and is the nearest lattice related to the central point $\tilde{X}_0$. For this reason, the solution of ZF detection (the lattice $\hat{X}_{ZF}$) must have a norm $C_{ZF}$ related to the central point $\tilde{X}_0$ that is longer than (or equal to) the norm $C_{ML}$ between the lattice $\hat{X}_{ML}$ and the central point $\tilde{X}_0$. Please note that, $C_{ZF}$ and $C_{ML}$, the result of eq. 7 being applied to $\hat{X}_{ZF}$ and $\hat{X}_{ML}$ respectively, results in the following relationship:

$$0 \leq C_{ML} \leq C_{ZF} \qquad \text{eq. 8}$$

According to eq. 8, applying $\tilde{X}_0$ to be the central point and $C_{ZF}$ to be the radius to construct a sphere, guarantees that $\hat{X}_{ML}$ locates inside the sphere and means that users can search the solution of ML detection $\hat{X}_{ML}$ inside the sphere to simplify the original searching procedures applied in eq. 2. From a viewpoint of eq. 6, searching procedures of eq. 2 are equivalent to searching for $\hat{X}_{ML}$ inside a sphere with an unlimited radius, so the complexity is higher than the present invention, which searches for $\hat{X}_{ML}$ in a sphere applying $\tilde{X}_0$ to be the central point and $C_{ZF}$ to be the radius. Meanwhile, from eq. 4 and eq. 5, the solution point of ZF detection $\hat{X}_{ZF}$ is the lattice determined through making a hard decision to the central point $\tilde{X}_0$, and $C_{ZF}$ is the norm between the lattice $\hat{X}_{ZF}$ and the central point $\tilde{X}_0$. Hence the method utilizing $\tilde{X}_0$ to be the central point and $C_{ZF}$ to be the radius to construct a sphere and searching for the lattice $\hat{X}_{ML}$ inside the sphere is more efficient.

Figure 2:
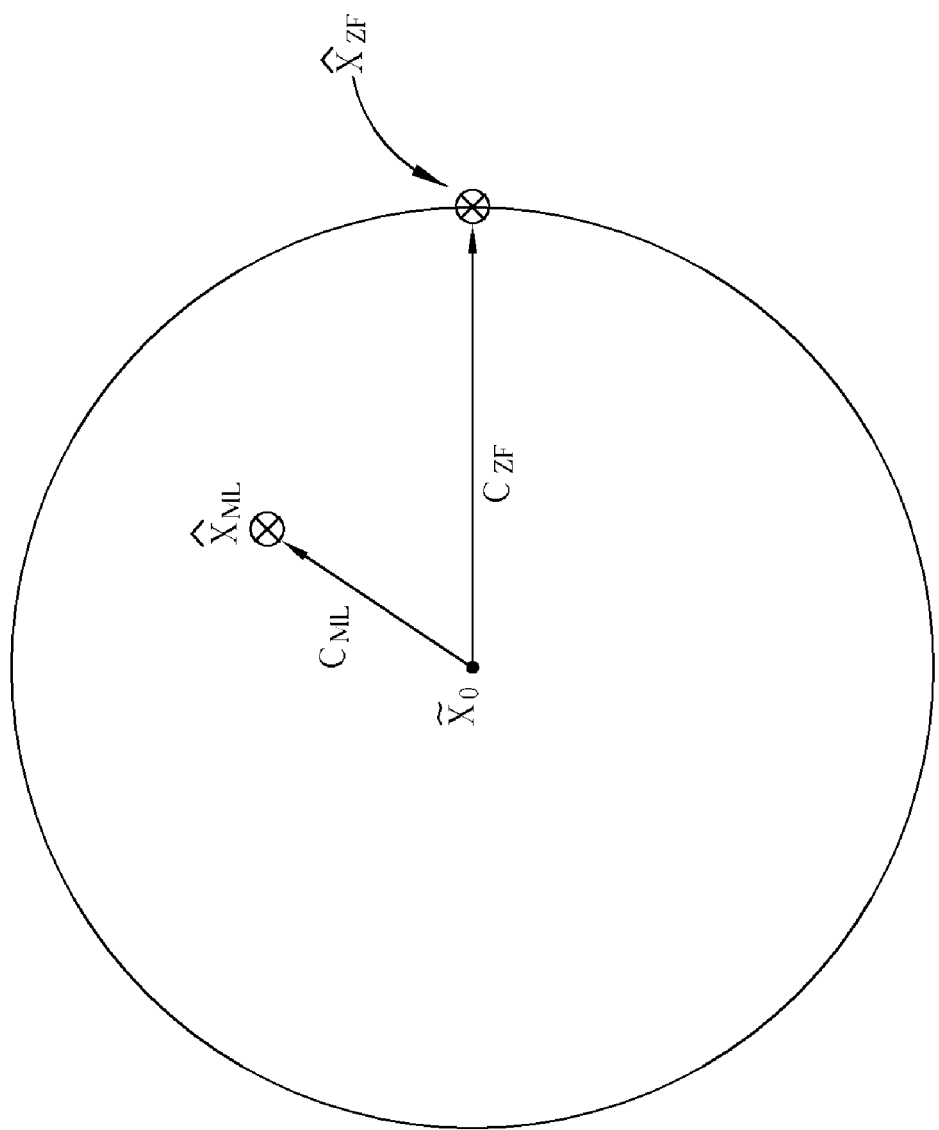
FIG. 2 is a diagram of utilizing $C_{ZF}$ to be a radius and $\tilde{X}_0$ to be a central point to search the solution of ML detection according to an embodiment of the present invention.

Due to the prior art utilizing $\tilde{X}_0$ to be a center to construct a sphere with a proper radius and then finding the lattice $\hat{X}_{ML}$ inside the sphere, it is obvious that if the radius is not long enough, the solution point $\hat{X}_{ML}$ will not be included inside the sphere, so the radius should be increased to reconstruct a new sphere and searching procedures of the solution of ML detection $\hat{X}_{ML}$ should be repeated again. On the other hand, the present invention utilizes $\tilde{X}_0$ to be a center and $C_{ZF}$ to be a radius for constructing a sphere and then finds the solution of ML detection $\hat{X}_{ML}$ inside the sphere. It is therefore guaranteed that $\hat{X}_{ML}$ locates inside the sphere. Please refer to eq. 8 and FIG. 2; FIG. 2 is a diagram of utilizing $C_{ZF}$ to be a radius and $\tilde{X}_0$ to be a central point to search the solution of ML detection according to an embodiment of the present invention.

Next, how to identify whether the lattice is inside the sphere after defining the sphere radius $C_{ZF}$ will be further discussed. Now, the concept about searching for the solution point inside the sphere is clear, but there is no clear mathematical equation to accomplish the searching action on the electric circuit.

Through a mathematic operation such as Cholesky factorization in the linear algebra, eq. 7 is transformed into:

$$C = (X-\tilde{X}_0)^H H^H H(X-\tilde{X}_0) = (X-\tilde{X}_0)^H U^H U(X-\tilde{X}_0) \qquad \text{eq. 9}$$

wherein U is an M×M upper triangular matrix. In general, the diagonal elements $u_{ii}$, i=1,2, ... ,M are all greater than zero. Introducing the concept of the sphere and the above-mentioned radius $C_{ZF}$, the desired lattice must satisfy:

$$C = (X-\tilde{X}_0)^H U^H U(X-\tilde{X}_0) \qquad \text{eq. 10}$$

$$= \sum_{i=1}^{M} u_{ii}^2 \left| x_i - \tilde{x}_i + \sum_{j=i+1}^{M} \frac{u_{ij}}{u_{ii}} (x_j - \tilde{x}_j) \right|^2 \leq C_{ZF}$$

wherein the central point $\tilde{X}_0 = [\tilde{X}_1 \ \tilde{X}_2 \ldots \tilde{X}_M]^T$ and $X = [X_1 \ X_2 \ldots X_M]^T$, T represent transposition. Referring to eq. 10, if only the term i=M is left, the following equation is obtained:

$$u_{MM}^2 |x_M - \tilde{x}_M|^2 \leq C_{ZF} \Rightarrow |x_M - \tilde{x}_M|^2 \leq \frac{C_{ZF}}{u_{MM}^2} = r_M^2 \qquad \text{eq. 11}$$

Please note that a new radius $r_M^2 = C_{ZF}/u_{MM}^2$ is defined. The object of transforming eq. 10 to eq. 11 is to obtain the solution of ML detection $\hat{X}_{ML} = [X'_{1,ML} \ X'_{2,ML} \ldots X'_{M,ML}]^T$ from eq. 10. It is necessary to try all possible sets $X = [X_1 \ X_2 \ldots X_M]^T$ to find one set $\hat{X}_{ML} = [X'_{1,ML} \ X_{2,ML} \ldots X'_{M,ML}]^T$ such that C has a minimum value $C_{ML}$. From eq. 11, we can determine a searching range about the ML solution $X'_{M,ML}$ of $X_M$ delivered by the Mth antenna of the transmitter. That is, there may be several $X_M$ satisfying eq. 11, and the solution $X'_{M,ML}$ is among these $X_M$. For every candidate $X_M$ that satisfies eq. 11, eq. 10 can be utilized to obtain two terms i=M−1 and i=M $$u_{(M-1)(M-1)}^2 \left| x_{M-1} - \tilde{x}_{M-1} + \frac{u_{(M-1)M}}{u_{(M-1)(M-1)}} (x_M - \tilde{x}_M) \right|^2 + \quad \text{eq. 12}$$
$$u_{MM}^2 |x_M - \tilde{x}_M|^2 \leq C_{ZF}$$

to find several possible $X_{M-1}$ corresponding to each $X_M$ satisfying eq. 11. Through repeating the procedure recursively until i=1, several sets $X=[X_1 X_2 \ldots X_M]^T$ will be obtained, and can then be applied to eq. 9 and eq. 10, to determine the solution set $\hat{X}_{ML}=[X'_{1,ML} X'_{2,ML} \ldots X'_{M,ML}]^T$ with minimum C. But it is still difficult to find all possible $X_M$ satisfying eq. 11, so eq. 11 is rewritten as $$|X_M - \tilde{X}_M|^2 \leq r_M^2 \quad \text{eq. 13}a$$

or:

$$|X_M - \tilde{X}_M| \leq r_M \quad \text{eq. 13}b$$

The present invention provides a simplified method to be realized in the electric circuit. The simplified method utilizes a searching range a little larger than the original range defined by eq. 13a and eq. 13b to cover the solution point $X'_{M,ML}$.

Because $X_M$ utilizes BPSK, 4-QAM, 16-QAM, 64-QAM, 256-QAM, or other high-level modulation methods, $X_M$ can be separated into a real part $Xi_M$ and an imaginary part $Xj_M$ respectively. Similarly, $\tilde{X}_M$ is also separated into a real part $\tilde{X}i_M$ and an imaginary part $\tilde{X}j_M$, and eq. 13b can be rewritten as:

$$|X_M - \tilde{X}_M| = |(Xi_M - \tilde{X}i_M) + j(Xj_M - \tilde{X}j_M)| \leq r_M \quad \text{eq. 14}$$

Utilizing a simple algebra relationship $$|Xi_M - \tilde{X}i_M| \leq |(Xi_M - \tilde{X}i_M) + j(Xj_M - \tilde{X}j_M)| \text{ and}$$

$$|Xj_M - \tilde{X}j_M| \leq |(Xi_M - \tilde{X}i_M) + j(Xj_M - \tilde{X}j_M)|, \text{eq. 14 can be further analyzed to obtain the following relationship:}$$

$$\begin{cases} |(xi_M - \tilde{x}i_M)| \leq r_M \\ |(xj_M - \tilde{x}j_M)| \leq r_M \end{cases} \quad \text{eq. 15}$$

Figure 3:
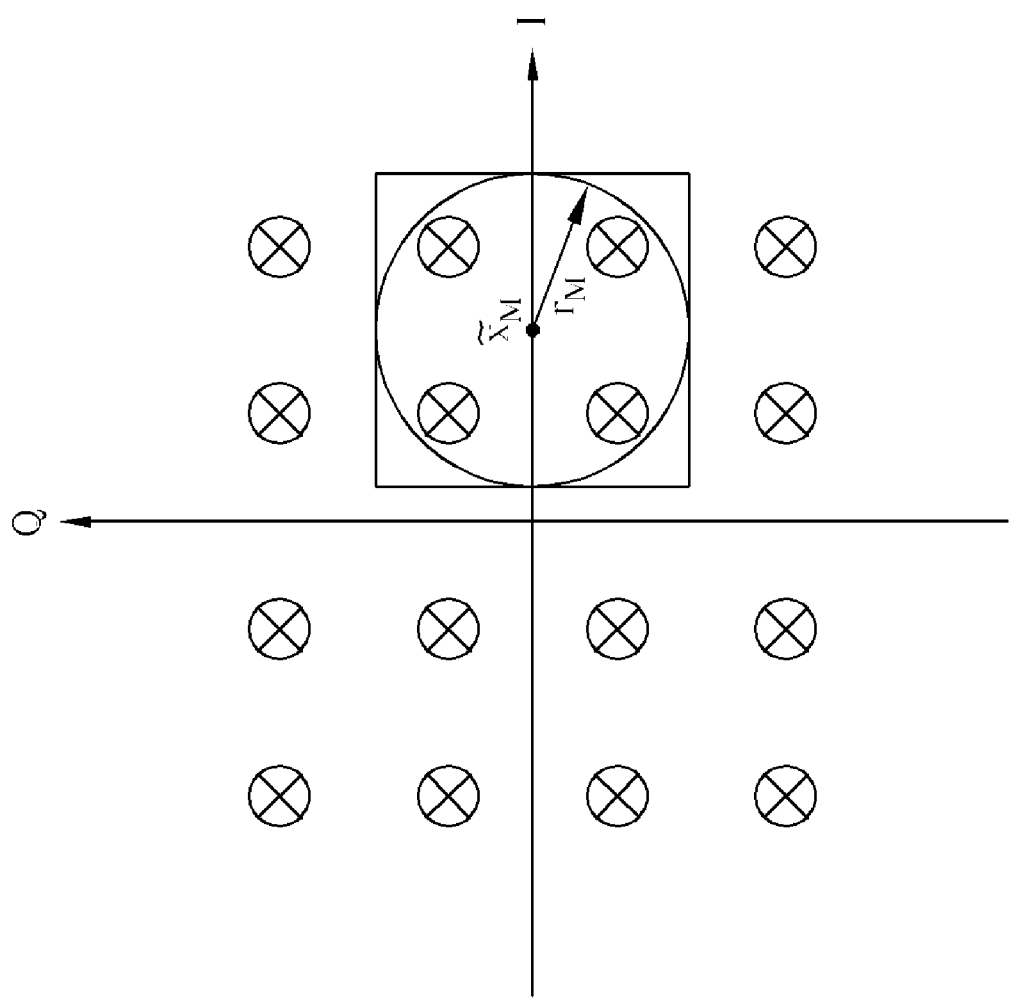
FIG. 3 is a diagram of the searching range of ML detection, according to an embodiment of the present invention.

The solution that satisfies eq. 14 also surely satisfies eq. 15. Please refer to FIG. 3. FIG. 3 is a diagram illustrating the searching range of ML detection according to an embodiment of the present invention.

From FIG. 3, it is obvious that the solution point satisfying eq. 14 locates inside a circle. The central point of the circle in FIG. 3 is $\tilde{X}_M$, due to the solution point satisfying eq. 15 locates inside the square (shown in FIG. 3); as the square surrounds the circle, the solution point satisfying eq. 14 must satisfy eq. 15 too. Originally, we have to find solutions including $X'_{M,ML}$ through eq. 14, and it is very complex to realize this on integrated circuits. By the method disclosed in the present invention, the searching method is transferred to a simpler method for finding the solution of eq. 15. Taking a 16-QAM modulation illustrated in FIG. 3 for example, the present invention constructs a square with the smallest area to exactly surround the circle, and defines a searching range about the real and imaginary part of the solution $X'_{M,ML}$ through separate projection for axis I and axis Q. Explicitly speaking, the searching range of $X'_{M,ML}$ on axis I and Q, $x'i_{M,ML}$ and $X'j_{M,ML}$, is limited by the following equations:

$$\lceil \tilde{x}i_M - r_M \rceil \leq Xi_M \leq \lfloor \tilde{x}i_M + r_M \rfloor \quad \text{eq. 15}a$$

$$\lceil \tilde{x}j_M - r_M \rceil \leq Xj_M \leq \lfloor \tilde{x}j_M + r_M \rfloor \quad \text{eq. 15}b$$

wherein function $\lceil \ \rceil$ means a minimum integer not less than the operated parameter. Similarly, function $\lfloor \ \rfloor$ means a maximum integer not greater than the operated parameter. As a result, the solutions satisfying eq. 15a must include $X'i_{M,ML}$ and the solutions satisfying eq. 15a must include $X'j_{M,ML}$. Consequently, the present invention provides eq. 15a and eq. 15b for easily completing on circuits through limiting the searching range of $X'_{M,ML}$ on both axes Q and I. In a preferred embodiment, $X'_{M,ML}$ utilizes separate projection for I and Q to respectively define a searching range, or processes I and Q together for creating a square on the complex plane to define the searching range of $X'_{M,ML}$. Furthermore, in the procedure of recursively performing sphere decoding to find remaining $X_{M-1}, X_{M-2}, \ldots, X_1$, the searching range is capable of using eq. 15a and eq. 15b to search the solution of ML detection $X_{M-1}, X_{M-2}, \ldots, X_1$. Another embodiment of the present invention replaces the circle with a square to respectively search the ML solution on axes Q and I. In fact, for requirements of particular circuit application, the method for searching $X'_{M,ML}$ on the complex plane through respectively searching I and Q is variable, i.e. separately defining searching ranges of I and Q. For example, shortening the searching range of the axis I to reduce circuit complexity, enables the solution point $X'_{M,ML}$ to be searched for inside a rectangle or a square on the complex plane.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for identifying a plurality of symbols transmitted by a transmitter of a wireless communication system according to a plurality of signals received by a receiver of the wireless communication system, the method being implemented in the receiver and for searching a solution point of maximum-likelihood (ML) detection according to the plurality of signals and thereby identifying the plurality of symbols, the method comprising:
   utilizing a zero-forcing detection to process the plurality of signals and thereby provide a central point;
   slicing the central point to provide a solution point for the zero-forcing detection;
   calculating a radius $C_{ZF}$ for the ML detection, the radius $C_{ZF}$ being the distance between the central point and the solution point for the zero-forcing detection, which consequently results in the radius $C_{ZF}$ longer than or equal to a distance $C_{ML}$ from the central point to a solution point of the ML detection;
   determining a searching range of the ML detection according to the central point and the radius $C_{ZF}$;
   determining one or more qualified solution points according to the plurality of signals and the searching range; and
   determining one of the one or more qualified solution points as the solution point of the ML detection.

2. The method of claim 1, wherein the searching range is a sphere, the central point and the radius $C_{ZF}$ define the sphere, and the ML detection utilizes a sphere decoding method.

3. The method of claim 1, wherein the searching range is a rectangle.

4. The method of claim 3, wherein the central point is a geometric center of the rectangle and both length and width of the rectangle are not shorter than double the radius $C_{ZF}$.

5. The method of claim 1, wherein the searching range is a square.

6. The method of claim 5, wherein the central point is a geometric center of the square and each side length of the square is not shorter than double the radius $C_{ZF}$.

7. The method of claim 1, wherein the receiver of the wireless communication system has a plurality of antennas for receiving the signals.

8. The method of claim 1, wherein the slicing comprises rounding each coordinate of the central point to a nearest integer.

9. The method of claim 1, wherein the solution point of the zero-forcing detection is a point that is on a zero-forcing lattice.

10. The method of claim 9, wherein the central point is a point that is not on the zero-forcing lattice.

11. The method of claim 1, wherein the central point is an intermediate unrounded result of zero-forcing detection.

12. A wireless communication receiver, comprising:
logic that utilizes a zero-forcing detection to process a plurality of signals received from a transmitter and thereby provide a central point;
logic that slices the central point to provide a solution point for the zero-forcing detection;
logic that calculates a radius $C_{ZF}$ for a maximum-likelihood (ML) detection, the radius $C_{ZF}$ being the distance between the central point and the solution point for the zero-forcing detection;
logic that determines a searching range of the ML detection according to the central point and the radius $C_{ZF}$; and
logic that determines at least one qualified solution point for the ML detection according to the plurality of signals and the searching range.

* * * * *